United States Patent
Suzuki

(10) Patent No.: US 8,559,128 B2
(45) Date of Patent: Oct. 15, 2013

(54) SERVO PATTERN WRITING METHOD, CONTROL CIRCUIT, AND MAGNETIC DISK APPARATUS

(75) Inventor: Noboyuki Suzuki, Kawasaki (JP)

(73) Assignee: Kabushiki Kaisha Toshiba, Tokyo (JP)

(*) Notice: Subject to any disclaimer, the term of this patent is extended or adjusted under 35 U.S.C. 154(b) by 487 days.

(21) Appl. No.: 12/902,335

(22) Filed: Oct. 12, 2010

(65) Prior Publication Data

US 2011/0026160 A1 Feb. 3, 2011

Related U.S. Application Data

(63) Continuation of application No. PCT/JP2008/058282, filed on Apr. 30, 2008.

(51) Int. Cl.
G11B 21/02 (2006.01)

(52) U.S. Cl.
USPC ............................................. 360/75

(58) Field of Classification Search
None
See application file for complete search history.

(56) References Cited

U.S. PATENT DOCUMENTS

| | | | |
|---|---|---|---|
| 5,668,679 A | 9/1997 | Swearingen et al. | |
| 7,245,445 B2* | 7/2007 | Lee | 360/48 |
| 7,388,728 B1* | 6/2008 | Chen et al. | 360/77.08 |
| 7,453,661 B1* | 11/2008 | Jang et al. | 360/75 |
| 7,567,403 B2* | 7/2009 | Sacks et al. | 360/75 |
| 7,679,851 B1* | 3/2010 | Sun et al. | 360/75 |
| 2003/0197968 A1* | 10/2003 | Sacks et al. | 360/75 |
| 2004/0061967 A1* | 4/2004 | Lee et al. | 360/75 |
| 2004/0105185 A1 | 6/2004 | Park et al. | |
| 2004/0212917 A1 | 10/2004 | Yano | |
| 2005/0264917 A1 | 12/2005 | Yano et al. | |
| 2006/0209452 A1 | 9/2006 | Sado et al. | |
| 2007/0047132 A1 | 3/2007 | Sado et al. | |

FOREIGN PATENT DOCUMENTS

| | | |
|---|---|---|
| JP | 2000-268516 | 9/2000 |
| JP | 2001-189062 | 7/2001 |
| JP | 2004-079167 | 3/2004 |
| JP | 2004-227735 | 8/2004 |
| JP | 2004-326966 | 11/2004 |
| JP | 2005-346766 | 12/2005 |
| JP | 2006-260715 | 9/2006 |
| JP | 2007-066420 | 3/2007 |

OTHER PUBLICATIONS

International Search Report mailed Jun. 10, 2008, in Int'l. App. No. PCT/JP2008/058282.

* cited by examiner

*Primary Examiner* — Hoa T Nguyen
*Assistant Examiner* — James L Habermehl
(74) *Attorney, Agent, or Firm* — Greer, Burns & Crain, Ltd.

(57) ABSTRACT

According to one embodiment, a servo pattern writing method includes: moving a head from a first one of innermost and outermost circumferences of a medium to the remainder other than the first one while controlling a position of the head in accordance with a temporary pattern preliminarily written on the medium; calculating a junction between a servo pattern to be written from the innermost circumference and a servo pattern to be written from the outermost circumference based on a movement distance of the head; first writing the servo pattern from a second one of the innermost and outermost circumferences to the junction, while controlling the position of the head in accordance with the temporary pattern; and second writing the servo pattern from the remainder other than the second one to the junction, while controlling the position of the head in accordance with the temporary pattern.

4 Claims, 12 Drawing Sheets

JUNCTION PORTION

JUNCTION PORTION

JUNCTION PORTION

SERVO PATTERN WRITING METHOD, CONTROL CIRCUIT, AND MAGNETIC DISK APPARATUS

CROSS-REFERENCE TO RELATED APPLICATIONS

This application is a continuation of PCT international application Ser. No. PCT/JP2008/058282 filed on Apr. 30, 2008 which designates the United States, incorporated herein by reference.

FIELD

Embodiments described herein relate generally to a servo pattern writing method on a storage medium, a control circuit, and a magnetic disk apparatus.

BACKGROUND

In recent years, regarding writing a servo pattern by STW (Servo Track Writer), various writing methods are disclosed for the purpose of improving the quality of written servo pattern and shortening the writing time.

(1) Single Direction Writing Method Using Single Plate STW or Stack Servo Track Writer Conventionally, when a servo pattern is written by the STW, a single direction writing method using a single plate STW or stack servo track writer is used in which a servo pattern is written in a single direction from inner circumference to outer circumference of a medium or from the outer circumference to the inner circumference.

However, in a medium on which a servo pattern is written by using this method, as illustrated in FIGS. 10A and 10B, side fringes due to the written servo pattern are mixed in the outer circumference portion and the inner circumference portion compared with the middle circumference portion. Therefore, a magnetic disk apparatus using such a medium reads a read signal with the side fringe superimposed as noise when demodulating the servo pattern. As a result, the read signal is injected into a servo loop as a RRO (Repeatable Run Out) or NRRO (Non-Repeatable Run Out), so that positioning accuracy deteriorates.

(2) Both Direction Writing Method Using Single Plate STW

As a method for compensating for the deterioration of positioning accuracy in the single direction writing method using the single plate STW, a both direction writing method using the single plate STW is disclosed in which the side fringe is remaining as few as possible as illustrated in FIG. 11 (refer to Japanese Patent Application Publication (KOKAI) No. 2006-260715 and U.S. Patent Application Publication Serial No. 2006/0209452A1). The both direction writing method using the single plate STW is a method in which, for example, the servo pattern is written from the outer circumference to the inner circumference in the outer circumference portion of the medium, and the servo pattern is written from the inner circumference to the outer circumference in the inner circumference portion of the medium. In a magnetic disk apparatus on which the servo pattern is written by using this method, it is possible to selectively use only a portion on which the side fringe remaining in the pattern written on the medium has less effect.

However, the STW using this method is affected by so-called backlash of a head actuator system, since the head actuator while writing the servo pattern does not operate in a single direction, but operates to and fro. The backlash means a mechanical allowance (or looseness) between a motor output and a load, and especially means a mechanical allowance between a voice coil motor and a head. Therefore, the backlash is not a problem for the STW in a mechanism moving in a single direction. However, the STW in a mechanism moving to and fro cannot match the starting point and the returning point accurately due to the above mentioned allowance.

In other words, in the STW in which the head is not positioned directly to the medium, for example, the servo pattern written from the outer circumference and the servo pattern written from the inner circumference cannot be joined to each other correctly at a scheduled radius position in a middle circumference portion of the medium due to the effect of the backlash when the servo pattern is written with the to and fro movement. Specifically, an area in which the servo pattern is not written is generated (refer to FIG. 12), or contrary to this, a pattern written later is overwritten on a pattern which has been written from the opposite direction (refer to FIG. 13), or a pattern at the junction which cannot be correctly demodulated as a servo pattern is written (refer to FIG. 14). Therefore, in a magnetic disk apparatus using such a medium, the head cannot be correctly positioned at the portions illustrated in FIGS. 12 to 14 as described above.

(3) Servo Pattern Writing Method Using Self-STW

As a method for compensating for the disadvantage in the both direction writing method using the single plate STW, a servo pattern writing method using the self-STW is disclosed (refer to Japanese Patent Application Publication (KOKAI) No. 2005-346766, U.S. Patent Application Publication Serial No. 2005/0264917A1, and U.S. Pat. No. 5,668,679). The STW using this method writes a seed track to an innermost circumference to be a reference, and then, performs servo pattern writing toward an outermost circumference direction while controlling the position of the head using the written seed track pattern to form a servo pattern on the entire surface. In other words, the STW increases a gradient of magnetic transition of the servo data, and re-records (re-writes) the servo pattern, whose recording quality deteriorates, from the outermost circumference to the middle circumference.

(4) Operation Method on Junction

As another method for compensating for the disadvantage in the both direction writing method using single plate STW, a method is disclosed in which the servo pattern is not formed on the junction and the head can pass over the junction having no servo pattern by a seek operation (refer to Japanese Patent Application Publication (KOKAI) No. 2004-326966 and U.S. Patent Application Publication Serial No. 2004/0212917A1). In other words, the STW does not write the servo pattern on an area near the portion where the both direction writings join to each other when writing the servo pattern from both directions. The magnetic disk apparatus controls the head to pass over the portion where the both direction writings join to each other without using the junction as a user area by the seek operation.

However, in the above described conventional technique of (3) servo pattern writing method using self-STW, the head positioning quality deteriorates because track misregistration of the re-recorded servo pattern is not improved.

Also, in the above described conventional technique of (4) Operation method on junction, a performance of sequential access deteriorates because the head has to be operated so as not to seek a part of the medium. In addition, in (4) Operation method on junction, a data storage capacity decreases because a part of the medium is not used as a data capacity, and a capacity and a development work of firmware increase because special firmware is required so that the head does not seek a part of the medium.

Specifically, in (3) servo pattern writing method using self-STW, when re-recording (re-writing) the servo pattern from the outermost circumference to the middle circumference, the servo pattern is re-recorded while a head is positioned with respect to the servo pattern whose recording quality deteriorates. Therefore, even though the signal quality itself of the re-recorded servo pattern is improved, the track misregistration of the re-recorded servo pattern due to deterioration of head positioning quality when re-recording the servo pattern is not improved.

In the method of (3), since the servo pattern for a part where the recording quality deteriorates is re-recorded after the servo pattern is once formed on the entire surface, a total servo pattern writing time is increased by a time necessary for re-recording of the part compared with a case that the servo pattern is simply formed on the entire surface. For example, if it is simply assumed that the time required for writing on the entire area=1, and a half the entire area is re-recorded, in order to completely record the servo pattern with the (3) method, the servo pattern writing time is "time required for simply writing on the entire area=1"+"time required for re-recording=0.5", so that about 1.5 times the servo pattern writing time is consumed. Therefore, the processing time increases, so that, also considering the increase of servo pattern writing time due to high density recording in the future, it cannot be expected that manufacturing efficiency will be improved.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Figure 1:
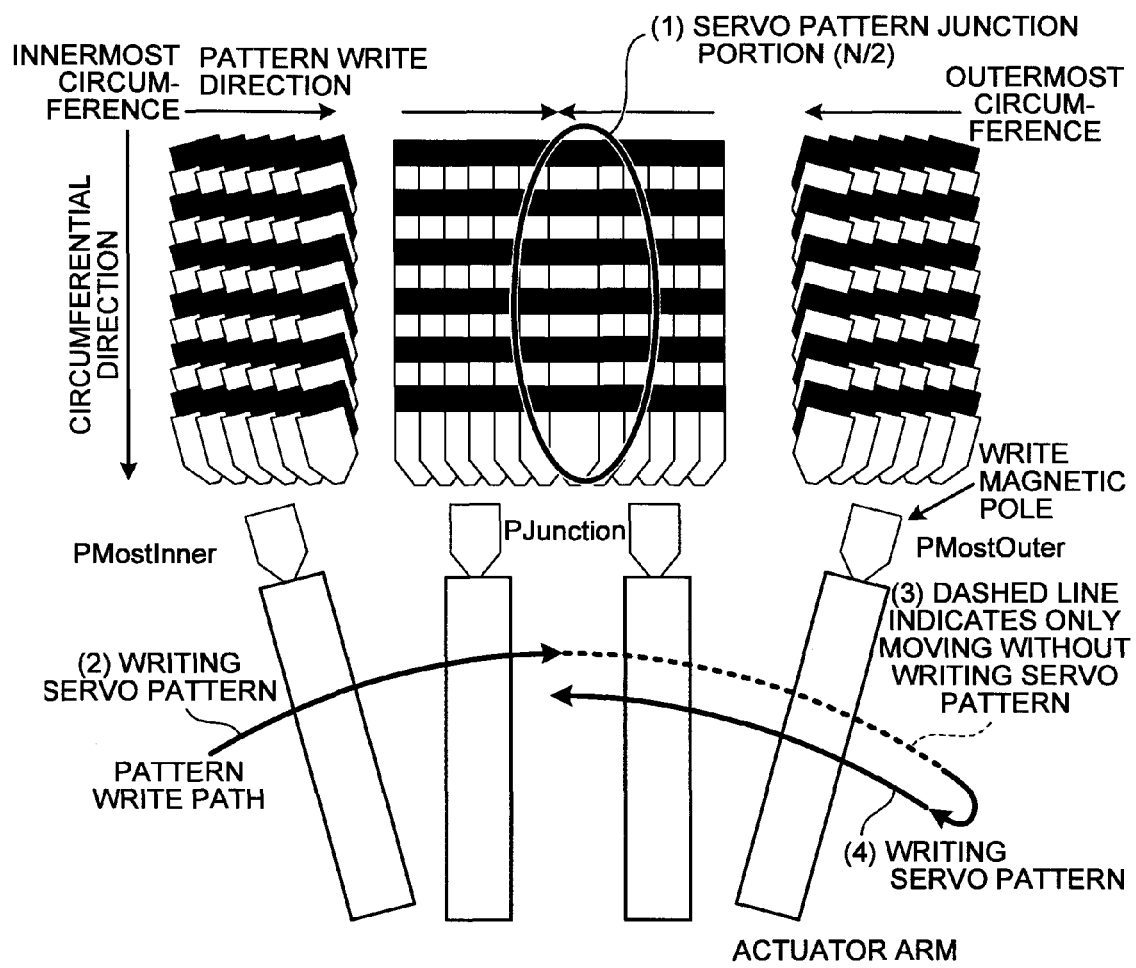
FIG. 1 is an exemplary view for illustrating an outline of a magnetic disk apparatus according to a first embodiment.

In general, according to one embodiment, a servo pattern writing method comprises moving, calculating, first writing, and second writing. The moving includes moving a head from a first one of an innermost circumference and an outermost circumference of a medium to the remainder other than the first one while controlling a position of the head in accordance with a temporary pattern indicating information for controlling the position of the head, the temporary pattern being preliminarily written on the medium. The calculating includes calculating a junction between a servo pattern to be written from the innermost circumference and a servo pattern to be written from the outermost circumference based on a movement distance of the moved head. The first writing includes writing the servo pattern from a second one of the innermost circumference and the outermost circumference to the junction, while controlling the position of the head in accordance with the temporary pattern, after moving the head to the second one. The second writing includes writing the servo pattern from the remainder other than the second one to the junction, while controlling the position of the head in accordance with the temporary pattern, after moving the head to the remainder other than the second one.

According to another embodiment of the invention, a servo pattern writing apparatus comprises a moving module, a calculator, a first writer, and a second writer. The moving module is configured to move a head from a first one of an innermost circumference and an outermost circumference of a medium to the remainder other than the first one while controlling a position of the head in accordance with a temporary pattern indicating information for controlling the position of the head, the temporary pattern being preliminarily written on the medium. The calculator is configured to calculate a junction between a servo pattern to be written from the innermost circumference and a servo pattern to be written from the outermost circumference based on a movement distance of the moved head. The first writer is configured to write the servo pattern from a second one of the innermost circumference and the outermost circumference to the junction, while controlling the position of the head in accordance with the temporary pattern, after moving the head to the second one. The second writer is configured to write the servo pattern from the remainder other than the second one to the junction, while controlling the position of the head in accordance with the temporary pattern, after moving the head to the remainder other than the second one.

According to still another embodiment of the invention, a control circuit comprises a moving module, a calculator, a first writer, and a second writer. The moving module is configured to move a head from a first one of an innermost circumference and an outermost circumference of a medium to the remainder other than the first one while controlling a position of the head in accordance with a temporary pattern indicating information for controlling the position of the head, the temporary pattern being preliminarily written on the medium. The calculator is configured to calculate a junction between a servo pattern to be written from the innermost circumference and a servo pattern to be written from the outermost circumference based on a movement distance of the moved head. The first writer is configured to write the servo pattern from a second one of the innermost circumference and the outermost circumference to the junction, while controlling the position of the head in accordance with the temporary pattern, after moving the head to the second one. The second writer is configured to write the servo pattern from the remainder other than the second one to the junction, while controlling the position of the head in accordance with the temporary pattern, after moving the head to the remainder other than the second one.

According to still another embodiment of the invention, a magnetic disc apparatus comprises a moving module, a calculator, a first writer, and a second writer. The moving module is configured to move a head from a first one of an innermost circumference and an outermost circumference of a medium to the remainder other than the first one while controlling a position of the head in accordance with a temporary pattern indicating information for controlling the position of the head, the temporary pattern being preliminarily written on the medium. The calculator is configured to calculate a junction between a servo pattern to be written from the innermost circumference and a servo pattern to be written from the outermost circumference based on a movement distance of the moved head. The first writer is configured to write the servo pattern from a second one of the innermost circumference and the outermost circumference to the junction, while controlling the position of the head in accordance with the temporary pattern, after moving the head to the second one. The second writer is configured to write the servo pattern from the remainder other than the second one to the junction, while controlling the position of the head in accordance with the temporary pattern, after moving the head to the remainder other than the second one.

Hereinafter, embodiments of a servo pattern writing method, a servo pattern writing apparatus, a control circuit, and a magnetic disk apparatus will be described in detail with reference to the accompanying drawings. In the description below, an outline of the magnetic disk apparatus according to one embodiment, and a configuration and a process flow of the magnetic disk apparatus will be described in order, and finally various modifications of the embodiment will be described.

First, the outline of the magnetic disk apparatus according to the first embodiment will be described. FIG. 1 is an exemplary view for illustrating the outline of the magnetic disk apparatus according to the first embodiment.

The magnetic disk apparatus according to the first embodiment is an apparatus such as an STW (Servo Track Writer) or the like which receives a medium on which a temporary pattern is written to write, based on the temporary pattern, a servo pattern used finally when the product is operated. In the magnetic disk apparatus according to the first embodiment, it is especially possible to prevent a quality of head positioning from deteriorating, prevent a storage capacity of a medium from being reduced, constitute a high performance apparatus at low cost, and shorten a time necessary for writing a servo pattern.

The temporary pattern not necessarily has to be a temporary servo pattern before shipping. But, it is only necessary for the temporary pattern to be information with which a position of a head can be controlled. The temporary pattern may be written concentrically or may be a spiral pattern written in a spiral fashion continuously from an innermost circumference (innermost track) to an outermost circumference (outermost track).

The outline of the magnetic disk apparatus according to the first embodiment will be described. The magnetic disk apparatus moves the magnetic head from the innermost circumference of the received medium to the outermost circumference while controlling the position of the magnetic head in accordance with the temporary pattern preliminarily written on the medium, and calculates a junction between the servo pattern to be written from the innermost circumference and the servo pattern to be written from the outermost circumference based on a movement distance of the moved magnetic head (refer to (1) in FIG. 1).

Specifically, when the medium is mounted, the magnetic disk apparatus starts an SPM (spindle motor) to rotate the medium. Next, the magnetic disk apparatus moves the magnetic head from above a ramp until the magnetic head reaches a position of an inner stopper arranged in the innermost circumference. After moving the magnetic head to the innermost circumference, the magnetic disk apparatus moves the magnetic head located on the innermost circumference to the outermost circumference while positioning the magnetic head by using the temporary pattern preliminarily written on the medium.

Thereafter, the magnetic disk apparatus calculates, as the junction (junction track), a midpoint (N/2) of the movement amount (distance=N) of the magnetic head moved from the inner most circumference to the outer most circumference of the medium. Here, although an example is described in which a position corresponding to the half of the movement distance of the magnetic head is determined as the junction, the junction is not limited to this, and the junction can be arbitrarily changed depending on, for example, a shape of a write magnetic pole, a swing range setting of a Yaw angle of the magnetic head.

Next, the magnetic disk apparatus moves the magnetic head to the innermost circumference, and writes the servo pattern from the innermost circumference to the calculated junction while controlling the position of the magnetic head in accordance with the temporary pattern (refer to (2) in FIG. 1).

Specifically, after calculating the junction, the magnetic disk apparatus moves the magnetic head until the magnetic head reaches the position of the inner stopper arranged in the innermost circumference, and writes the servo pattern, which is finally used when the product is operated, from the innermost circumference to which the magnetic disk is moved, to the calculated junction (N/2) while controlling the position of the magnetic head in accordance with the temporary pattern.

Thereafter, the magnetic disk apparatus moves the magnetic head to the outermost circumference, and writes the servo pattern from the outermost circumference to the calculated junction while controlling the position of the magnetic head in accordance with the temporary pattern (refer to (3) and (4) in FIG. 1).

Specifically, after the servo pattern is written from the innermost circumference to the junction, the magnetic disk apparatus moves the magnetic head from the junction to the outermost circumference based on the preliminarily written temporary pattern without writing the servo pattern. After moving the magnetic head from the junction to the outermost circumference without writing the servo pattern, the magnetic disk apparatus writes the servo pattern, which is finally used when the product is operated, from the outermost circumference to the junction, while controlling the position of the magnetic head in accordance with the temporary pattern.

As described above, the magnetic disk apparatus does not need to write a redundant servo pattern on the junction, does not need a special control of the head with respect to the medium on which the servo pattern is written, can use the junction as a user data area, and does not need to re-record the servo pattern after writing the servo pattern on the entire surface. As a result, the magnetic disk apparatus according to the first embodiment can prevent the quality of head positioning from deteriorating, prevent the storage capacity of the medium from being reduced, constitute the high performance apparatus at low cost, and shorten a time necessary for writing a servo pattern.

Configuration of the Magnetic Disk Apparatus

Next, a configuration of the magnetic disk apparatus illustrated in FIG. 1 will be described with reference to FIGS. 2 to 6. The overall configuration of the magnetic disk apparatus and its main function modules will be described in detail. Specifically, the overall configuration of the magnetic disk apparatus which writes the servo pattern on the medium (magnetic disk), a configuration of the medium, a configuration of a controller in the magnetic disk apparatus, a configuration of a RDC (Read Channel) in the magnetic disk apparatus, and a configuration of a SVC (Servo controller) in the magnetic disk apparatus will be described respectively.

Overall Configuration of the Magnetic Disk Apparatus

Figure 2:
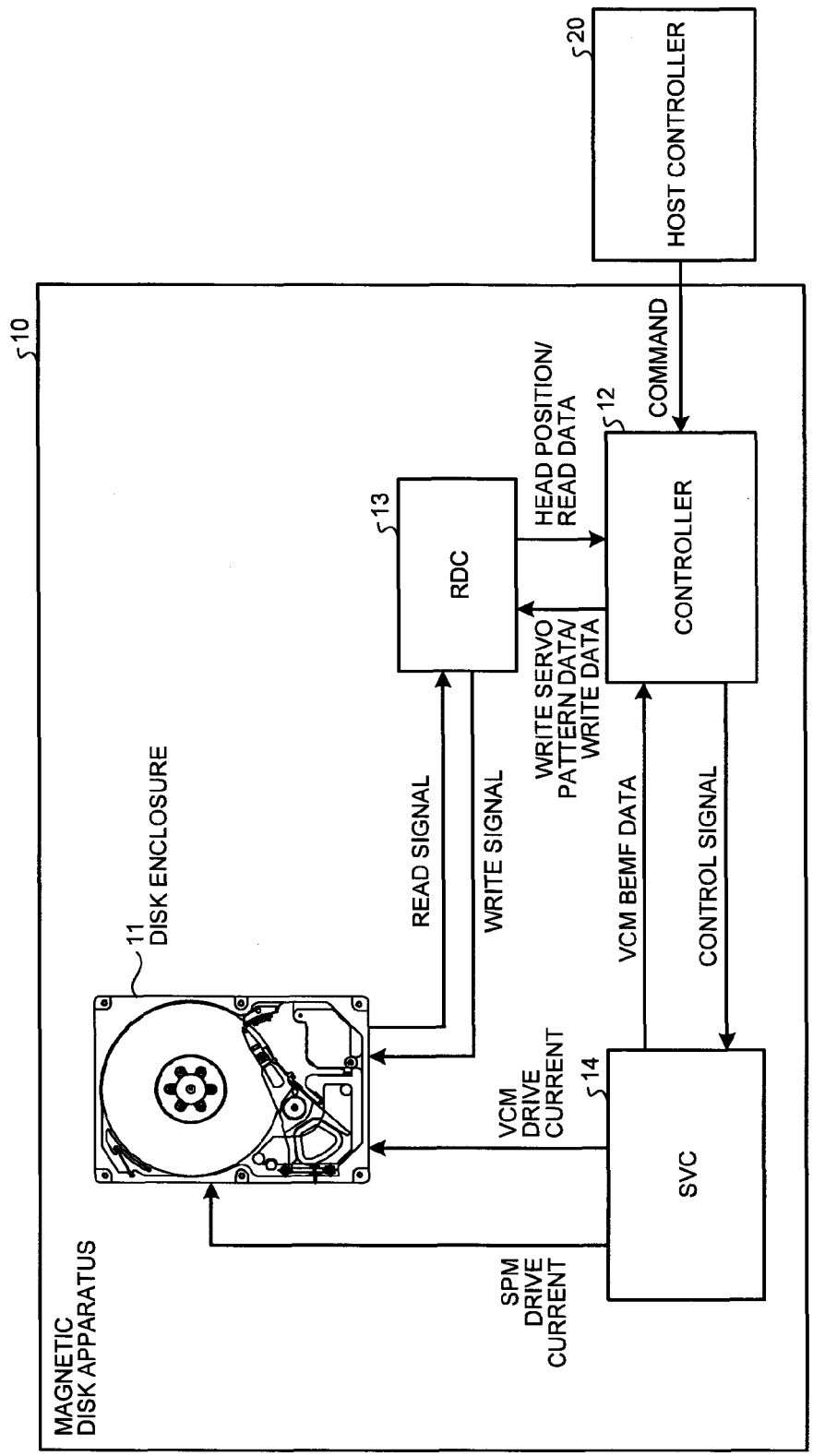
FIG. 2 is an exemplary block diagram of the magnetic disk apparatus in the first embodiment.

First, the overall configuration of the magnetic disk apparatus which writes the servo pattern on the magnetic disk will be described with reference to FIG. 2. FIG. 2 is an exemplary block diagram of the magnetic disk apparatus in the first embodiment.

As illustrated in FIG. 2, a magnetic disk apparatus 10 includes a disk enclosure 11, a controller 12, a RDC 13, and a SVC 14, and is connected to an host controller 20. The host controller 20 is a user terminal which issues a control command to the magnetic disk apparatus 10 to perform various controls. Specifically, the host controller 20 issues a command for mounting the disk enclosure 11 in the magnetic disk apparatus 10, a servo pattern write command, a data read command, a data write command, and the like.

The disk enclosure 11 is a magnetic disk including a medium on which the servo pattern is written by the magnetic disk apparatus 10. Specifically, the disk enclosure 11 starts a VCM (voice coil motor 11g described below) in accordance with "VCM (voice coil motor) Drive Current (VCM drive current)" inputted from the SVC 14 described below, and controls the magnetic head. Also, the disk enclosure 11 starts the SPM (spindle motor 11a described below) in accordance with "SPM (spindle motor) Drive Current (SPM drive current)" inputted from the SVC 14, and rotates the medium.

The disk enclosure 11 writes data on the medium in accordance with "Write signal" received from the RDC 13, and outputs data read from the medium to the RDC 13 as "Read signal".

The controller 12 performs various controls related to the magnetic disk apparatus 10 in accordance with instructions from the host controller 20. Specifically, when receiving the servo pattern write command from the host controller 20, the controller 12 issues "Control signal" to the SVC 14 to start the SPM and the VCM of the disk enclosure 11. The controller 12 receives "VCM BEMF Data (counter electromotive voltage)" from the SVC 14, head position information "Head Position" from the RDC 13, and the like, to control the position of the magnetic head.

Further, the controller 12 issues "Write Servo Pattern Data" and "Write Data" to the RDC 13 to write the servo pattern and user data on the medium included in the disk enclosure 11. When receiving the data read command from the host controller 20, the controller 12 performs the above mentioned processes, receives data "Read Data" read from the RDC 13, and output the data to the host controller 20.

The RDC 13 includes a modulation circuit for writing data to the disk enclosure 11, a demodulation circuit for reading data from the disk enclosure 11, and the like, and controls reading/writing data from/to the disk enclosure 11. Specifically, when receiving the servo pattern write signal "Write Servo Pattern Data" from the controller 12, the RDC 13 writes the servo pattern on the medium included in the disk enclosure 11, and when receiving a user data write signal "Write Data" from the controller 12, the RDC 13 writes the user data on the medium included in the disk enclosure 11. The RDC 13 outputs the read data and head position information "Head Position" to the controller 12.

The SVC 14 controls operation of the VCM described below in accordance with instructions from the controller 12. Specifically, when receiving a control signal "Control Signal" for the VCM and the SPM from the controller 12, the SVC 14 starts the SPM and controls the VCM so that the head moves to the data read position or the data write position. In addition, the SVC 14 outputs the counter electromotive voltage obtained by operating the VCM to the controller 12, in accordance with instructions from the controller 12.

A Configuration of the Medium (Disk Enclosure 11)

Figure 3:
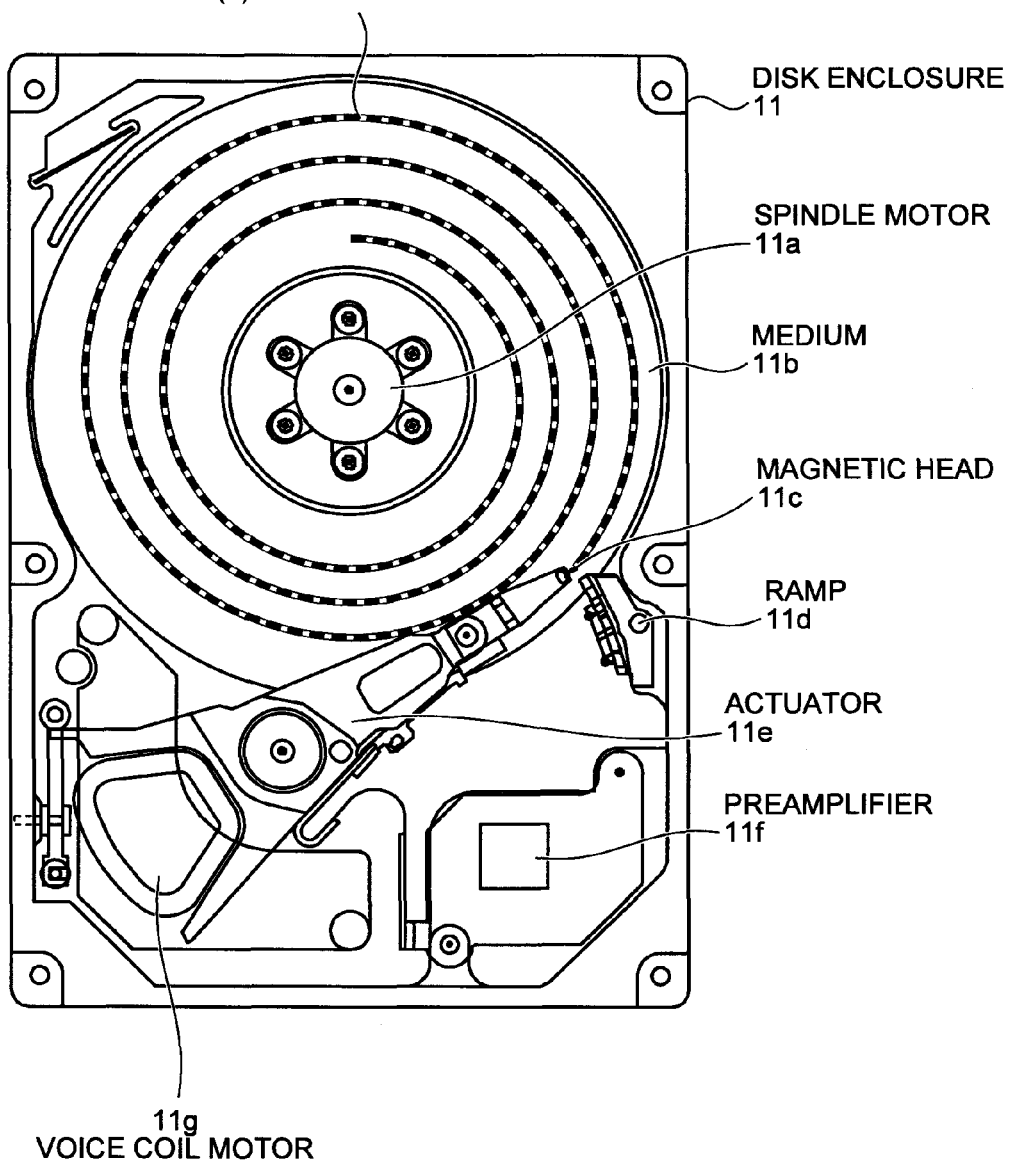
FIG. 3 is an exemplary block diagram of a medium in the first embodiment.

Next, a configuration of the disk enclosure 11 including the medium on which the servo pattern is written will be described with reference to FIG. 3. FIG. 3 is a block diagram of the medium in the first embodiment.

As illustrated in FIG. 3, the disk enclosure 11 includes the spindle motor (SPM) 11a, a medium 11b, a magnetic head 11c, a ramp 11d, an actuator 11e, a preamplifier 11f, and the voice coil motor (VCM) 11g.

The spindle motor (SPM) 11a is a motor that rotates the medium 11b. Specifically, the spindle motor 11a is connected to the SVC 14, and rotates the medium 11b or stops the rotating medium 11b in accordance with "SPM Drive Current" received from the SVC 14.

The medium 11b is a storage medium of a thin disk which is made of resin, coated with magnetic material, and supported by the spindle motor 11a. Various data are recorded and erased to and from the medium 11b by the magnetic head 11c. For a specific example, the medium 11b stores the temporary pattern by which the position of the magnetic head 11c can be controlled, and stores the servo pattern and the user data written by the magnetic head 11c. The temporary pattern may be stored concentrically on the medium 11b, and as illustrated in (a) of FIG. 3, may be stored as a spiral pattern written in a spiral fashion continuously from the innermost circumference to the outermost circumference of the medium 11b.

The magnetic head 11c is moved above the medium 11b by the voice coil motor 11g, and performs reading/writing data from/to the medium 11b. Actually, the magnetic head 11c is attached to the actuator 11e in a form of a head gimbal assembly (HGA) attached to a suspension. The HGA is unloaded during non-operating time so that the magnetic head 11c is moved away from the medium. The unload is performed by raising a lift tab of the magnetic head 11c located at the top end of the HGA along the slope of the ramp 11d, removing a slider from the medium 11b, and moving the HGA to a retreat position. Contrary to the unload, the load is performed by moving the HGA toward the medium 11b from the retreat position, sliding the lift tab down on the down slope to the medium 11b, and putting down the slider above the medium 11b.

For example, the magnetic head 11c is moved above the medium 11b by the voice coil motor 11g, and writes the servo pattern, which is used when the product is operated, on the medium 11b in accordance with "Write signal" received from the RDC 13. In a similar way, the magnetic head 11c is moved above the medium 11b by the voice coil motor 11g, and writes the user data on the medium 11b in accordance with "Write signal" received from the RDC 13.

Further, the magnetic head 11c is moved above the medium 11b by the voice coil motor 11g, and reads data from the medium 11b in accordance with "Read signal" received from the RDC 13 to output the read data to the preamplifier 11f.

The ramp 11d is a device for retracting the magnetic head 11c. Specifically, as described above, the magnetic head 11c is retracted by the actuator 11e and the voice coil motor 11g so that the magnetic head 11c not performing reading/writing data does not touch and damage the medium 11b.

The actuator 11e operates the magnetic head 11c by the voice coil motor 11g. Specifically, as described above, the actuator 11e is connected to the magnetic head 11c and the voice coil motor 11g in the HGA configuration. The actuator 11e moves the magnetic head 11c from the ramp 11d above the medium 11b when loading, and moves the magnetic head 11c from the medium 11b to the ramp 11d when unloading.

The preamplifier 11f is connected to the magnetic head 11c and the RDC 13. The preamplifier 11f amplifies the signal (data) read from the magnetic head 11c and outputs the amplified signal to the RDC 13. Thereafter, the data recorded on the medium 11b, which is read by the magnetic head 11c, is transmitted to a user.

The voice coil motor 11g is a motor for moving the magnetic head 11c by driving the actuator 11e. Specifically, the voice coil motor 11g drives the actuator 11e in accordance with "VCM Drive Current" outputted from the SVC 14, and moves the magnetic head 11c above the medium 11b or above the ramp 11d.

Configuration of Controller

Figure 4:
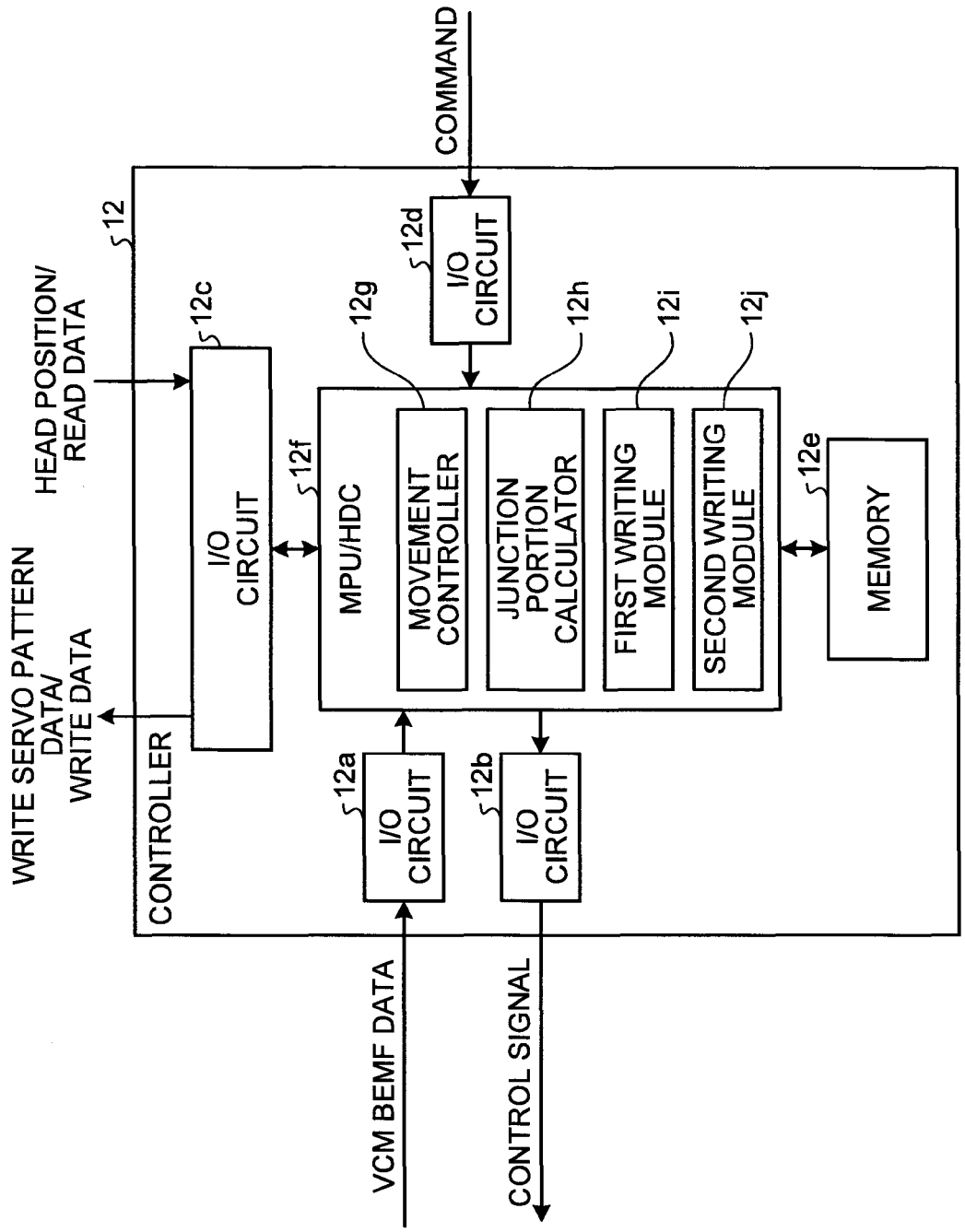
FIG. 4 is an exemplary block diagram of a controller in the first embodiment.

Next, a configuration of the controller 12 illustrated in FIG. 2 will be described with reference to FIG. 4. FIG. 4 is a block diagram of the controller in the first embodiment. As illustrated in FIG. 4, the controller 12 includes I/O circuits 12a to 12d, a memory 12e, and a MPU (Micro Processing Unit)/HDC (Hard Disk Controller) 12f.

The I/O circuit 12a is connected to the SVC 14, and receives the counter electromotive voltage obtained by driving the voice coil motor 11g by the SVC 14, and outputs the counter electromotive voltage to the MPU/HDC 12f. The I/O circuit 12b outputs to the SVC 14 the control signal, which is outputted from the MPU/HDC 12f, for operating the voice coil motor 11g and the spindle motor 11a.

The I/O circuit 12c is connected to the RDC 13, receives data "Read Data" and head position information "Head Position" which are read from the RDC 13, and outputs the data and the head position information to the MPU/HDC 12f. In addition, the I/O circuit 12c outputs "Write Servo Pattern Data" and "Write Data" which are received from the MPU/HDC 12f to the RDC 13. The I/O circuit 12d receives various commands (for example, load command, unload command, and the like) issued from the host controller 20, and outputs the commands to the MPU/HDC 12f.

The memory 12e stores various programs and constants which are read by the MPU/HDC 12f to be executed, and the like. Other than the programs, the memory 12e stores information indicating the junction, which is calculated by the MPU/HDC 12f, between the servo pattern written from the innermost circumference of the medium 11b and the servo pattern written from the outermost circumference.

The MPU/HDC 12f reads and executes the various programs stored in the memory 12e. The MPU/HDC 12f includes a control function for performing various processing in accordance with the various commands issued from the host controller 20, and especially includes a movement controller 12g, a junction calculator 12h, a first writing module 12i, and a second writing module 12j.

The movement controller 12g moves the magnetic head 11c from the innermost circumference of the medium 11b to the outermost circumference while controlling the position of the magnetic head 11c with respect to the temporary pattern preliminarily written in the received medium 11b. Specifically, the disk enclosure 11 is mounted in the magnetic disk apparatus 10, and the magnetic disk apparatus 10 receives a servo pattern write start command outputted from the host controller 20. Then, the movement controller 12g outputs the control signal for operating the voice coil motor 11g and the spindle motor 11a to the SVC 14 via the I/O circuit 12b to drive the magnetic head 11c of the disk enclosure 11. The movement controller 12g moves the magnetic head 11c until the magnetic head 11c reaches the inner stopper position on the innermost circumference of the medium 11b in the disk enclosure 11. Next, the movement controller 12g moves the magnetic head 11c from the innermost circumference of the medium 11b to the outermost circumference by using the counter electromotive voltage received via the I/O circuit 12a, the temporary pattern read by the magnetic head 11c via the I/O circuit 12c, and the like.

The junction calculator 12h calculates the junction between the servo pattern written from the innermost circumference and the servo pattern written from the outermost circumference based on the movement distance of the magnetic head 11c moved by the movement controller 12g. For a specific example, the junction calculator 12h receives from the movement controller 12g which moves the magnetic head 11c the movement distance (N) of the magnetic head 11c moved from the innermost circumference to the outermost circumference of the medium 11b in the disk enclosure 11. Then, the junction calculator 12h calculates the midpoint (N/2) of the received movement distance (N) of the magnetic head 11c as the junction to store into the memory 12e. Here, although the example is described in which a half of the movement distance of the magnetic head 11c is determined as the junction, the junction is not limited to this, and the junction can be arbitrarily changed depending on, for example, a shape of a write magnetic pole, a swing range setting of head Yaw angle.

The first writing module 12i moves the magnetic head 11c to the innermost circumference, and writes the servo pattern from the innermost circumference to the junction calculated by the junction calculator 12h while controlling the position of the magnetic head 11c in accordance with the temporary pattern. For a specific example, the first writing module 12i reads the junction (N/2) calculated by the junction calculator 12h from the memory 12e. Then, the first writing module 12i outputs the control signal for operating the voice coil motor 11g and the spindle motor 11a to the SVC 14 via the I/O circuit 12b, and moves the magnetic head 11c until the magnetic head 11c reaches the inner stopper position on the innermost circumference of the medium 11b in the disk enclosure 11. Thereafter, the first writing module 12i controls the position of the magnetic head 11c by using the counter electromotive voltage received via the I/O circuit 12a, the temporary pattern received via the I/O circuit 12c, and the like. As described above, the first writing module 12i writes the servo pattern, which is finally used when the product is operated, until the read junction (N/2) while controlling the position of the magnetic head 11c.

The second writing module 12j moves the magnetic head 11c to the outermost circumference, and writes the servo pattern from the outermost circumference to the junction calculated by the junction calculator 12h while controlling the position of the magnetic head 11c in accordance with the temporary pattern. For a specific example, when the servo pattern is written from the innermost circumference to the junction (N/2) by the first writing module 12i, the second writing module 12j outputs the control signal for operating the voice coil motor 11g and the spindle motor 11a to the SVC 14 via the I/O circuit 12b. Then, the second writing module 12j moves the magnetic head 11c from the junction (N/2) to the outermost circumference without writing the servo pattern.

Thereafter, the second writing module 12j controls the position of the magnetic head 11c which is moved from the junction (N/2) to the outermost circumference without writing the servo pattern, by using the counter electromotive voltage received via the I/O circuit 12a, the temporary pattern read by the magnetic head 11c via the I/O circuit 12c, and the like. As described above, the second writing module 12j writes the servo pattern, which is finally used when the product is operated, until the junction (N/2) read by the first writing module 12i while controlling the position of the magnetic head 11c in accordance with the preliminarily written temporary pattern.

Configuration of RDC

Figure 5:
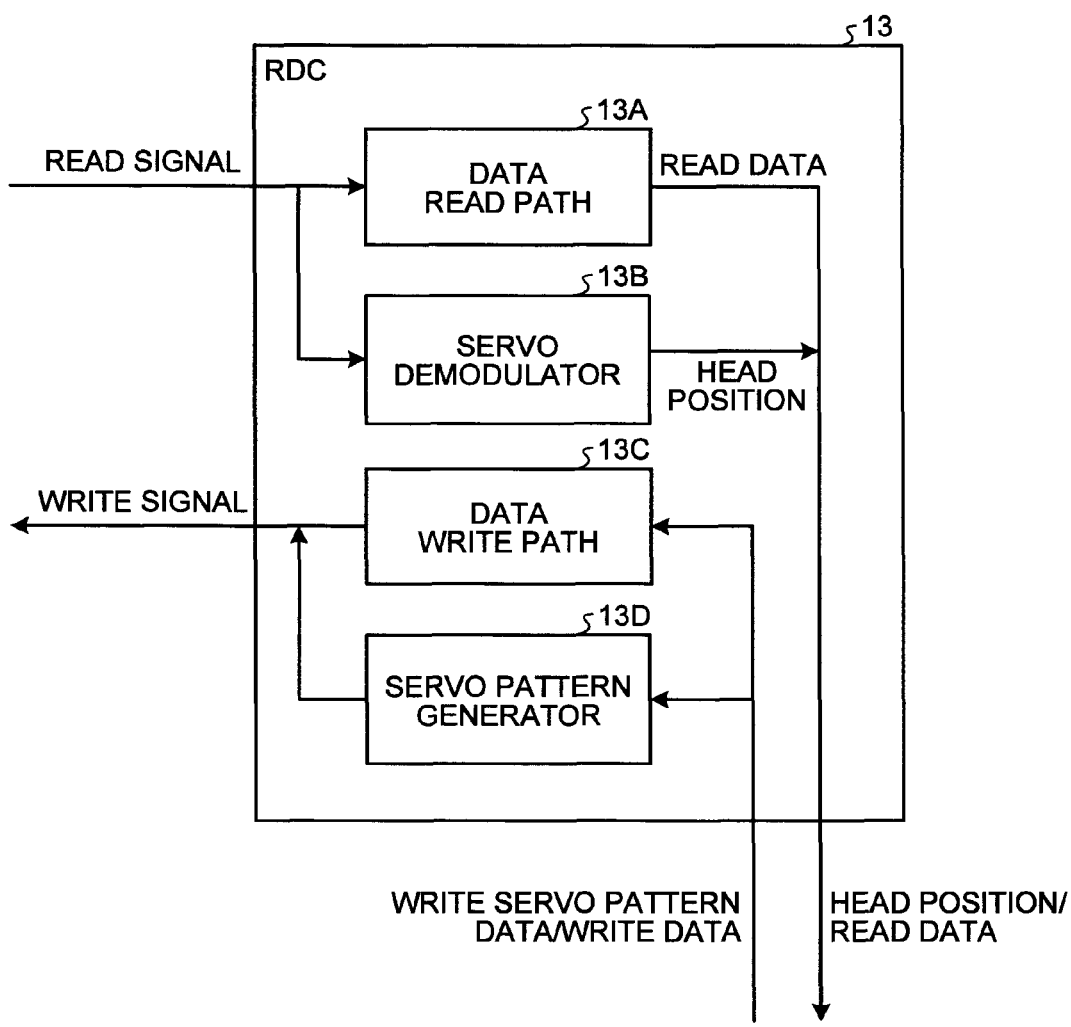
FIG. 5 is an exemplary block diagram of a RDC in the first embodiment.

Next, a configuration of the RDC 13 illustrated in FIG. 2 will be described with reference to FIG. 5. FIG. 5 is a block diagram of the RDC in the first embodiment. As illustrated in FIG. 5, the RDC 13 includes a data read path 13a, a servo demodulator 13b, a data write path 13c, and a servo pattern generator 13d.

The data read path 13a outputs to the MPU/HDC 12f read data obtained by demodulating a PreAmp Out "Read signal" outputted from the preamplifier 11f of the disk enclosure 11. In a similar way, the servo demodulator 13b outputs to the MPU/HDC 12f head position information obtained by demodulating a head position signal "Head Position" such as the servo pattern and the temporary pattern outputted from the preamplifier 11f of the disk enclosure 11.

The data write path 13c converts write data outputted from the MPU/HDC 12f into "Write Signal" and outputs the "Write Signal" to the preamplifier 11f of the disk enclosure 11. In a similar way, the servo pattern generator 13d converts servo pattern write data outputted from the MPU/HDC 12f into "Write Signal" and outputs the "Write Signal" to the preamplifier 11f of the disk enclosure 11. Then, the preamplifier 11f which receives the "Write Signal" provides a write current to the magnetic head 11c, and the magnetic head 11c generates a write magnetic field to form an intended magnetization pattern above the medium 11b.

Configuration of SVC

Figure 6:
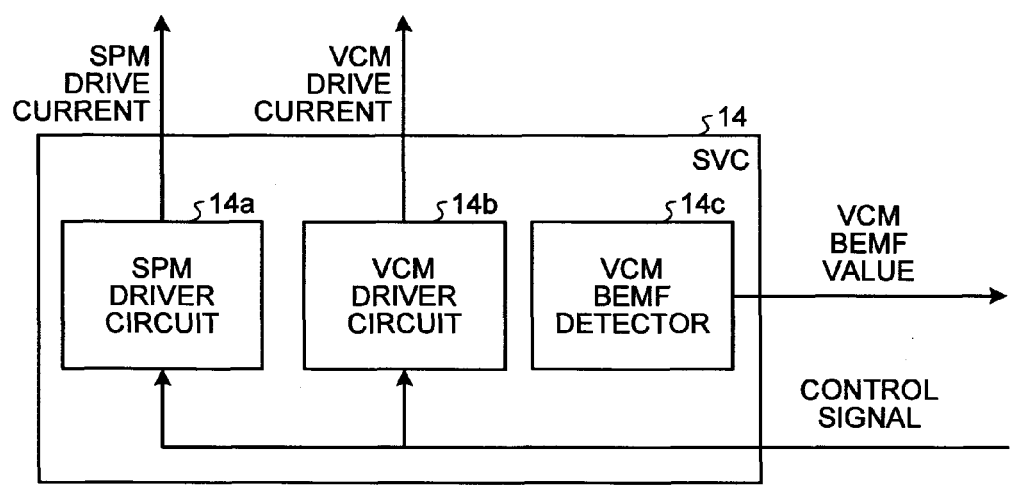
FIG. 6 is an exemplary block diagram of a SVC in the first embodiment.

Next, a configuration of the SVC 14 illustrated in FIG. 2 will be described with reference to FIG. 6. FIG. 6 is a block diagram of the SVC in the first embodiment. As illustrated in FIG. 6, the SVC 14 includes a SPM driver circuit 14a, a VCM driver circuit 14b, and a VCM BEMF detector 14c.

The SPM driver circuit 14a is a SPM drive circuit for driving the spindle motor 11a of the disk enclosure 11. The SPM driver circuit 14a generates "SPM Drive Current" in accordance with a control signal "Control Signal" outputted from the MPU/HDC 12f, and outputs the "SPM Drive Current" to the spindle motor 11a. In a similar way, the VCM driver circuit 14b is a VCM drive circuit for driving the voice coil motor 11g of the disk enclosure 11. The VCM driver circuit 14b generates "VCM Drive Current" in accordance with a control signal "Control Signal" outputted from the MPU/HDC 12f, and outputs the "VCM Drive Current" to the voice coil motor 11g.

The VCM BEMF detector 14c obtains the counter electromotive voltage of the voice coil motor 11g generated by driving the voice coil motor 11g of the disk enclosure 11, and outputs the obtained counter electromotive voltage to the MPU/HDC 12f as VCM BEMF Value.

Processing by the Magnetic Disk Apparatus

Figure 7:
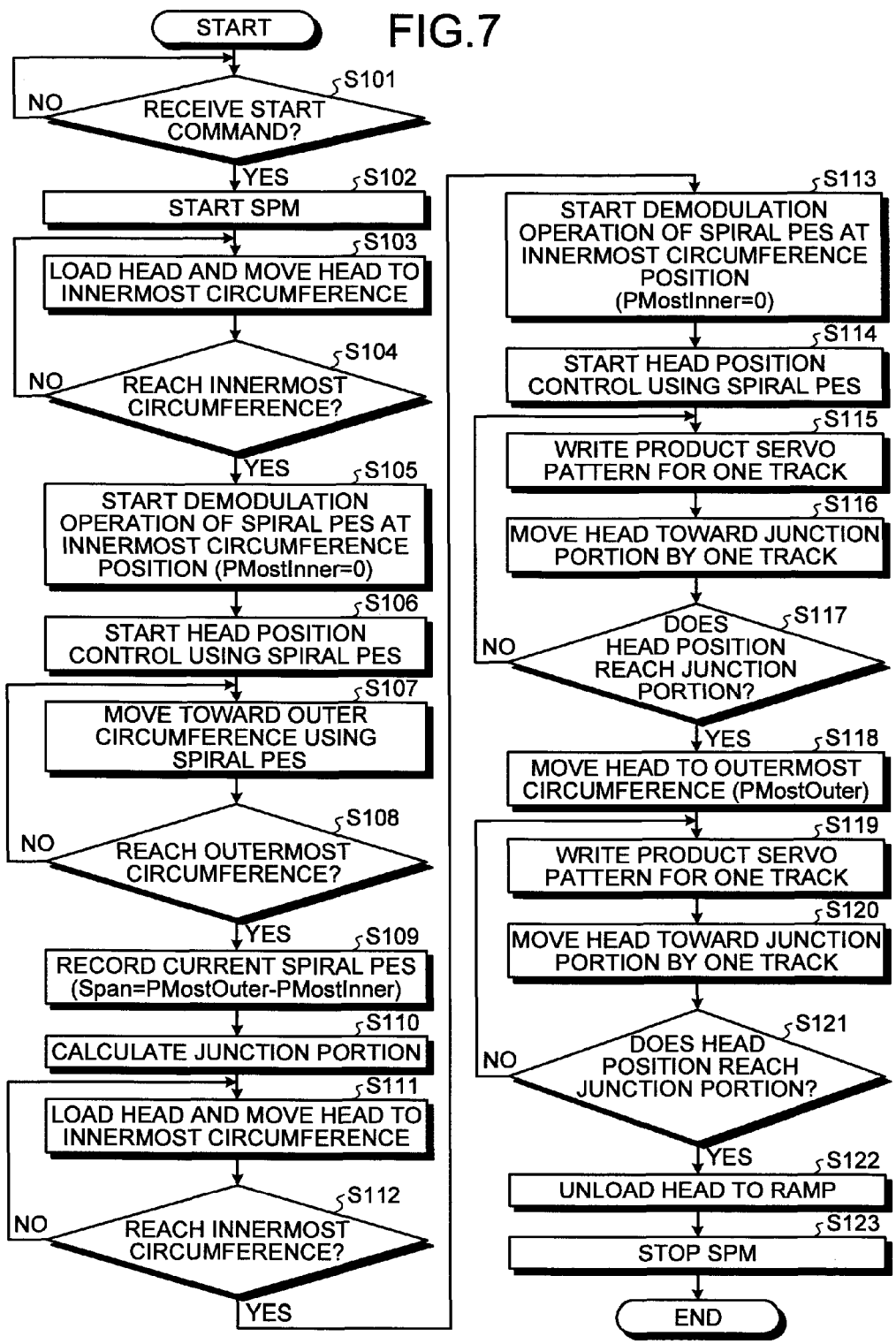
FIG. 7 is an exemplary flowchart of a processing in the magnetic disk apparatus in the first embodiment.

Next, the processing of the magnetic disk apparatus will be described with reference to FIG. 7. FIG. 7 is a flowchart of a processing in the magnetic disk apparatus in the first embodiment.

As illustrated in FIG. 7, when the disk enclosure 11 is mounted in the magnetic disk apparatus 10, and the magnetic disk apparatus 10 receives the servo pattern write start command from the host controller 20 (Yes at S101), the magnetic disk apparatus 10 starts the spindle motor 11a of the mounted disk enclosure 11 (S102). Specifically, the MPU/HDC 12f of the magnetic disk apparatus 10 outputs the control signal "Control Signal" to the SVC 14, starts the spindle motor 11a, accelerates the spindle motor 11a to a predetermined RPM, and then controls the spindle motor 11a in order to maintain the RPM.

After the spindle motor 11a is started, the magnetic disk apparatus 10 loads the magnetic head 11c of the disk enclosure 11 and moves the magnetic head 11c to the innermost circumference of the medium 11b (S103). Specifically, the MPU/HDC 12f communicates with the SVC 14 to transmit/receive various signals (control signal, counter electromotive voltage, and the like), controls a VCM current, and loads the magnetic head 11c from above the ramp 11d to above the medium 11b while controlling the speed.

When the magnetic head 11c reaches the innermost circumference of the medium 11b (Yes at S104), the magnetic disk apparatus 10 starts a demodulation operation of spiral PES that is the temporary pattern written on the medium 11b at a position on the innermost circumference (S105).

Specifically, when the magnetic head 11c reaches the inner stopper position (PMostInner) on the innermost circumference, the MPU/HDC 12f communicates with the RDC 13 in a state that the magnetic head 11c reaches the inner stopper on the innermost circumference to demodulate the spiral pattern written on the medium using the single plate STW. In other words, the MPU/HDC 12f starts generation of spiral Position Error Signal (spiral PES). The PES indicates a position error of the magnetic head 11c. Here, the PES means a relative position error amount between the spiral pattern written on the surface of the medium and the magnetic head 11c used for writing the servo pattern. In this way, it is possible to control the position of the magnetic head 11c, which is used for writing the servo pattern in addition to the controller 12 and the SVC 14, relatively to the spiral pattern on the medium 11b. Thus, because a feedback loop is configured to control the position of the magnetic head 11c with respect to the medium 11b, the disadvantage of backlash of the actuator 11e can be avoided.

Next, the magnetic disk apparatus 10 starts the position control of the magnetic head 11c by using the demodulated spiral PES, and moves the magnetic head 11c toward the outer circumference (S106 and S107). Specifically, the MPU/HDC 12f performs a move operation of the magnetic head 11c from the innermost circumference toward the outer circumference while controlling the position of the magnetic head 11c by using the spiral PES. The move operation means an operation in which the magnetic head 11c is moved while the target position is changed little by little in a state of position control but not in a state of speed control.

When the magnetic head 11c reaches the outermost circumference (Yes at S108), the magnetic disk apparatus 10 stores the current spiral PES (S109). Specifically, the MPU/HDC 12f detects whether or not the magnetic head 11c reaches the outermost circumference (PMostOuter) based on the presence or absence of the read signal from the magnetic head 11c. At this time, the MPU/HDC 12f records the movement distance "Span" from the innermost circumference of the spiral PES in the memory 12e. The reason why the MPU/HDC 12f can detect whether or not the magnetic head 11c reaches the outermost circumference based on the presence or absence of the read signal from the magnetic head 11c is because there is the ramp 11d at the outermost circumference. That is to say, when the magnetic head 11c reaches the ramp 11d, because the magnetic head 11c is removed from the medium 11b, the read signal from the magnetic head 11c disappears. When the read signal from the magnetic head 11c disappears as described above, the MPU/HDC 12f detects that the magnetic head reaches the outermost circumference. At this time, the magnetic head 11c is positioned above the ramp 11d.

Thereafter, the magnetic disk apparatus 10 calculates the junction between the servo pattern written from the innermost circumference and the servo pattern written from the outermost circumference (S110), and moves the magnetic head 11c to the innermost circumference (S111). Specifically, the MPU/HDC 12f calculates a spiral PES value corresponding to the junction (PJunction) in the middle circumference portion as "PJunction=Span/2" based on the recorded Span, and records the spiral PES value in the memory 12e. Thereafter, in the same way as in S102 to S104, the MPU/HDC 12f moves the magnetic head 11c located on the ramp 11d toward the innermost circumference until the magnetic head 11c reaches the inner stopper position (PMostInner) on the innermost circumference.

Next, when the magnetic head 11c reaches the innermost circumference (Yes at S112), in the same way as in S105, the magnetic disk apparatus 10 starts the demodulation operation of the spiral PES that is the temporary pattern written on the medium 11b at the position on the innermost circumference (S113).

While controlling the position of the head by using the demodulated spiral PES in the same way as in S106 (S114), the magnetic disk apparatus 10 writes a product servo pattern until the magnetic head 11c reaches the junction by moving the magnetic head 11c by one track every time a track of the product servo pattern is written (S115 and S116). Specifically, while controlling the position from the innermost circumference toward the junction (PJunction) in the middle circumference portion by using the spiral PES, the MPU/HDC 12f continues writing the servo pattern until the magnetic head 11c reaches the junction (PJunction) in the middle circumference portion.

Thereafter, when the magnetic head 11c reaches the junction in the middle circumference portion (Yes at S117), the magnetic disk apparatus 10 moves the magnetic head 11c to the outermost circumference (S118). Specifically, when the magnetic head 11c reaches the junction (PJunction) in the middle circumference portion, the MPU/HDC 12f moves the magnetic head 11c to the outermost circumference (PMostOuter) by the move operation described above without writing the servo pattern.

After the magnetic head 11c is moved to the outermost circumference, in the same way as in S115 to S117, while controlling the position of the magnetic head 11c from the outermost circumference by using the spiral PES, the magnetic disk apparatus 10 writes the product servo pattern until the magnetic head 11c reaches the junction by moving the magnetic head 11c by one track every time the track of the product servo pattern is written (S119 to S121).

Thereafter, when the magnetic head 11c which writes the servo pattern from the outermost circumference reaches the junction (Yes at S121), the magnetic disk apparatus 10 unloads the magnetic head 11c to the ramp 11d (S122), and stops the spindle motor 11a to end the process (S123). Specifically, when the magnetic head 11c moves by "Span/2", the MPU/HDC 12f determines that the magnetic head 11c reaches the junction, transmits a stop signal to the SVC 14 to stop the spindle motor 11a, and ends the process.

Remaining Amount of Write Fringe

Figure 8:
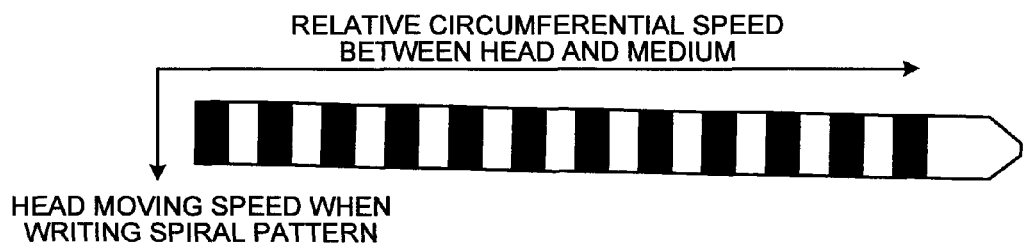
FIG. 8 is an exemplary view illustrating a spiral pattern preliminarily written in the medium in a linear form in the first embodiment.
Figure 9:
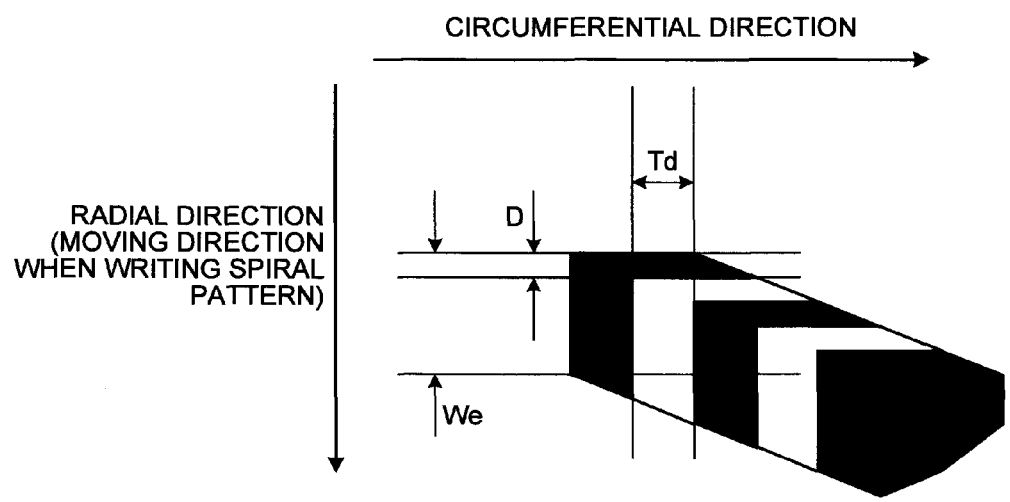
FIG. 9 is an exemplary view illustrating the spiral pattern preliminarily written in the medium in detail in the first embodiment.
Figure 10A:
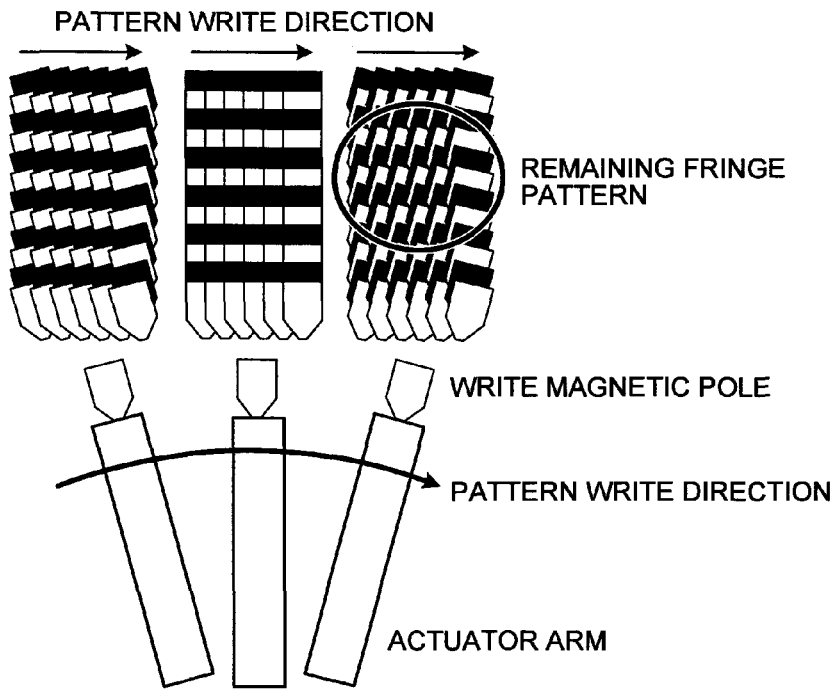
FIG. 10A is an exemplary view for illustrating an example according to a conventional technique in which side fringe is remained in a servo pattern written from inner circumference.
Figure 10B:
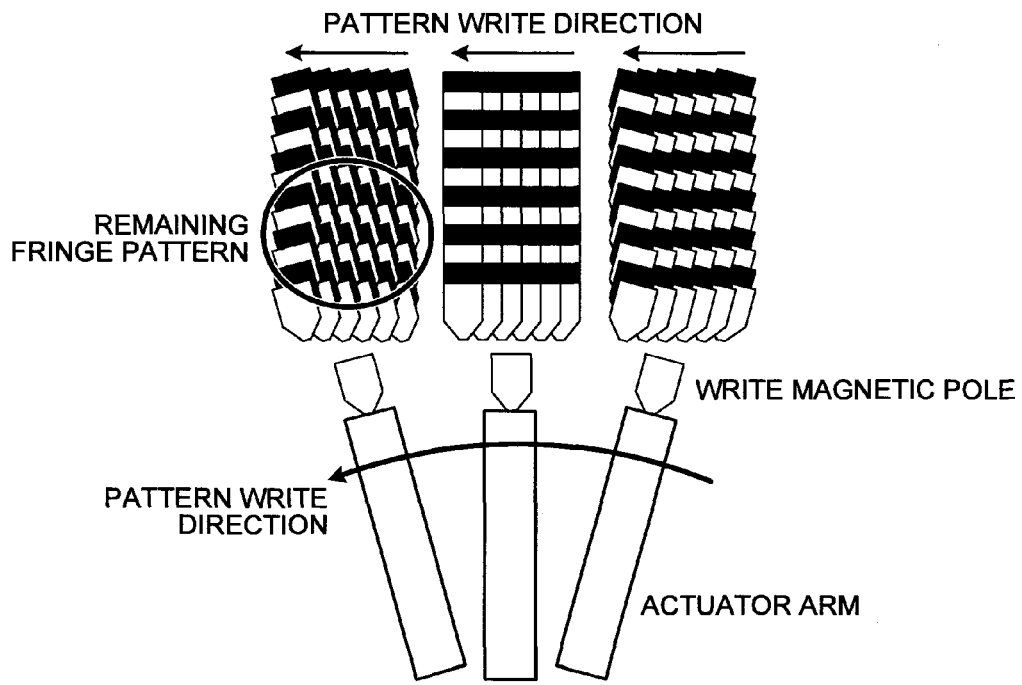
FIG. 10B is an exemplary view for illustrating an example according to another conventional technique in which side fringe is remained in the servo pattern written from outer circumference.
Figure 11:
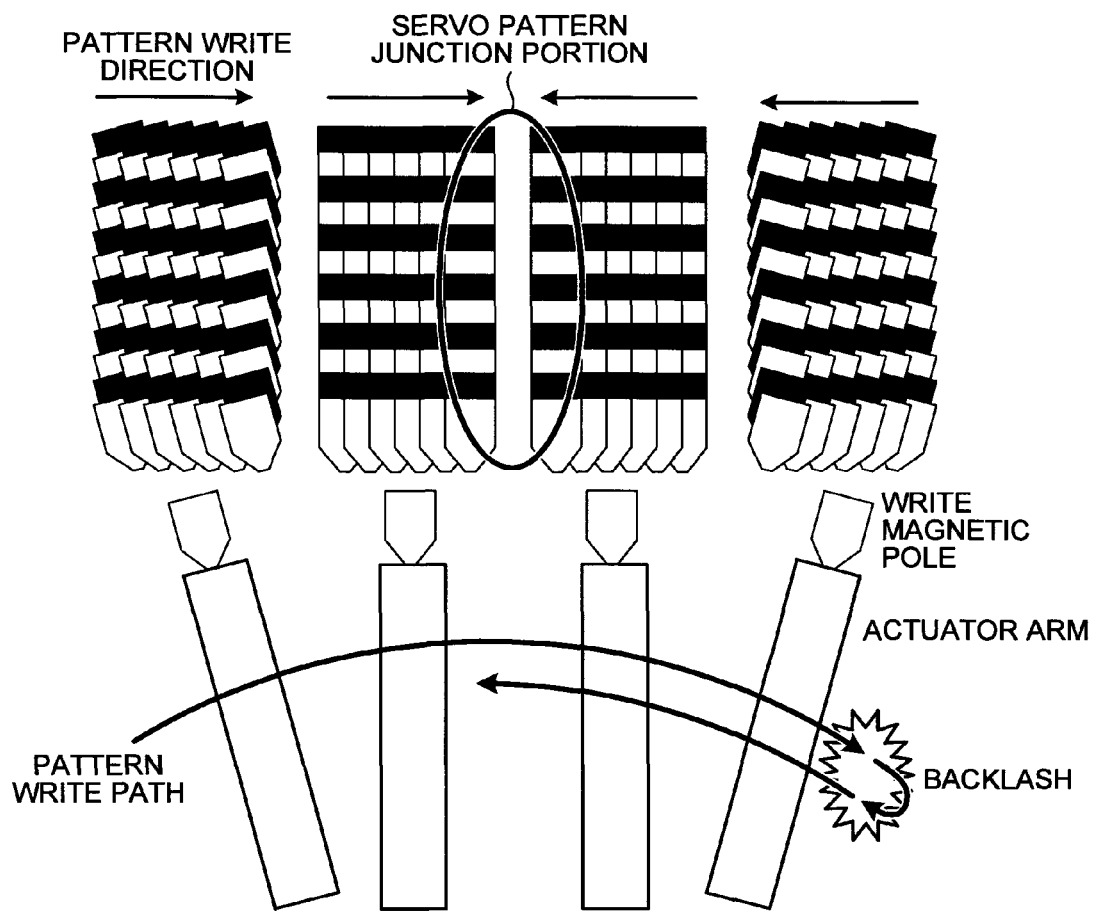
FIG. 11 is an exemplary view for illustrating an example according to still another conventional technique in which the servo pattern is written from both directions.
Figure 12:
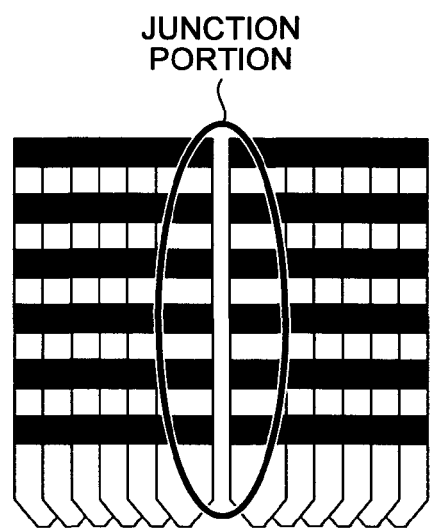
FIG. 12 is an exemplary view for illustrating an example according to the conventional technique in which the servo pattern is not continuously written in a junction when the servo pattern is written from both directions.
Figure 13:
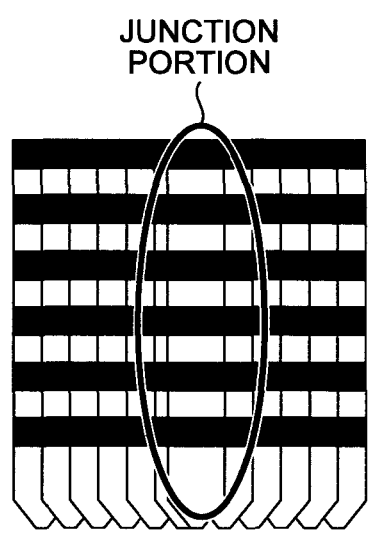
FIG. 13 is an exemplary view for illustrating an example according to the conventional technique in which the servo pattern is overwritten in a junction when the servo pattern is written from both directions.
Figure 14:
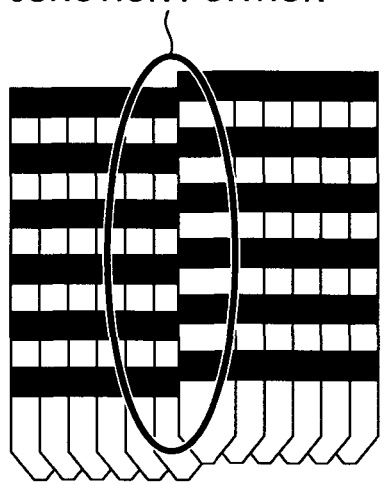
FIG. 14 is an exemplary view for illustrating an example according to the conventional technique in which a pattern that cannot be modulated is written in the junction when the servo pattern is written from both directions.

Next, a remaining amount of write fringes when the servo pattern is written by the magnetic disk apparatus of the first embodiment will be described with reference to FIGS. 8 and 9. FIG. 8 is a view for illustrating in a linear form the spiral pattern preliminarily written in the medium, and FIG. 9 is a view for illustrating in detail the spiral pattern preliminarily written in the medium.

Here, the write fringe when using the spiral pattern illustrated in FIG. 8 will be described (although the spiral pattern is illustrated in the linear form for convenience of illustration, the actual pattern has a spiral shape from the innermost circumference to the outermost circumference). Here, the write fringe when using the spiral pattern is estimated under the assumption of a 5400 rpm, 2.5-inch magnetic disk apparatus as the disk enclosure 11. Sizes of parts illustrated in FIG. 9 are only for example, and not limited to these sizes.

Various variables illustrated in FIG. 9 will be described. If it is assumed that a head moving speed Vs of when the spiral pattern is written is 0.07 (m/s), a dibit period Td of the STW pattern is 20 (ns), and an effective write core width We is 150 (nm), a magnetization reversal time Td of the servo pattern is 10 (ns) that is a half of the dibit period. On the other hand, a write head moving amount D in the radial direction while the magnetization reverses once is "D=Vs×Td=0.07 (m/s)×10 (ns)=0.7 (nm)".

Here, when comparing D and the width of the write pattern in the radial direction, or the effective write core width, the ratio R of these is calculated as follows: "R=D/We=0.7 (nm)/150 (nm)=0.467%". Because this value is sufficiently small, it would be fair to say that the write fringe of the spiral pattern can be ignored.

The recording density of the magnetic disk apparatus can be obtained as a product of a density in the track direction and a line recording density in the circumferential direction. In general, a recording density of a magnetic disk apparatus is increased without significantly changing the ratio of the above two densities (so-called aspect ratio).

By the way, the above described magnetization reversal time Td of the servo pattern is a function of the line recording density, and the head moving speed Vs of when the spiral pattern is written is a constant which can be selected independently from the recording density. Therefore, D is a function of the line recording density. The effective write core width We is a function of the track density.

Although R indicating a degree of influence of the write fringe is a function of D and We, a value of R does not change significantly, because D and We are bound to each other by the aspect ratio. As described above, even when a recording density of a magnetic disk apparatus is further increased in the future, it is possible to say that the influence of the write fringe of the spiral pattern does not increase extremely.

Advantages of the First Embodiment

As described above, according to the first embodiment, because the magnetic disk apparatus moves the magnetic head 11c from the innermost circumference to the outermost circumference of the medium while controlling the position of the magnetic head 11c in accordance with the preliminarily written temporary pattern, calculates the junction between the servo pattern written from the innermost circumference and the servo pattern written from the outermost circumference based on the movement distance of the moved magnetic head 11c, moves the magnetic head 11c to the innermost circumference to write the servo pattern from the innermost circumference to the calculated junction while controlling the position of the magnetic head 11c in accordance with the temporary pattern, moves the magnetic head 11c to the outermost circumference to write the servo pattern from the outermost circumference to the calculated junction while controlling the position of the magnetic head 11c in accordance with the temporary pattern, it is possible to prevent the head positioning quality from deteriorating, increase the storage capacity, constitute a high performance apparatus at low cost, and shorten the time necessary for writing the servo pattern.

Specifically, the RPE (Repeatable Positioning Error) and the NRPE (Non-repeatable Position Error) in each zone are prevented from becoming worse, and because a redundant pattern is not needed to be formed on the servo pattern junction, the storage capacity is not reduced. Although the servo pattern is written from both directions, there is no influence of the backlash of the actuator on the junction, so that continuous pattern can be written. Since a normal servo pattern can be formed even on the junction, there is no need to add a function to perform a special processing on the junction to a head position control system of the product, so that the apparatus can be constituted at low cost. Since user data can be recorded even on the servo pattern junction, data is not interrupted during, for example, a sequential access, so that a high performance can be continuously exhibited. In addition, the servo write time can be shortened compared with a method which re-records a part of the servo pattern whose recording quality deteriorates after the servo pattern is written on the entire surface, so that, for example, there is an advantage that the productivity increases by 1.5 times.

According to the first embodiment, since the temporary pattern preliminarily written on the medium 11b is a spiral pattern which is not a concentrically written pattern but is a pattern continuously written in a spiral fashion from the innermost circumference to the outermost circumference, the servo pattern can be written in accordance with the spiral pattern which can reduce the influence of write fringe, so that it is possible to prevent the positioning quality of the magnetic head 11c from deteriorating.

According to the first embodiment, the magnetic disk apparatus moves the magnetic head 11c from the innermost circumference to the outermost circumference of the medium while controlling the position of the magnetic head 11c by using a relative position error amount between the temporary pattern and the magnetic head 11c, writes the servo pattern from the innermost circumference to the junction while controlling the position of the magnetic head 11c in accordance with the temporary pattern by using the error amount, and writes the servo pattern from the outermost circumference to the junction while controlling the position of the magnetic head 11c in accordance with the temporary pattern by using the error amount. Therefore, it is possible to write the servo pattern more correctly, so that it is possible to strongly prevent the positioning quality of the magnetic head 11c from deteriorating.

Although the embodiment of the invention is described above, the invention may be implemented in various different forms other than the above described embodiment. Therefore, as illustrated below, different embodiments will be described by categorizing them into (1) Servo pattern write sequence, (2) Types of media, (3) System configuration, and (4) Program.

(1) Servo Pattern Write Sequence

For example, although, in the first embodiment, an example in which, after calculating the junction, the servo pattern is written from the innermost circumference to the junction, and thereafter the servo pattern is written from the outermost circumference to the junction is described, the embodiment is not limited to this. The servo pattern may be written from the outermost circumference to the junction first, and thereafter the servo pattern may be written from the innermost circumference to the junction. In addition, if the disk enclosure 11 having two magnetic heads 11c is used, both the writing of the servo pattern from the innermost circumference to the junction and the writing of the servo pattern from the outermost circumference to the junction can be performed simultaneously.

(2) Types of Media

The magnetic disk apparatus can use a perpendicular magnetic recording medium, which records digital signal information "0" and "1" by associating them to "upward direction" and "downward direction" of a minute magnetization, as the medium 11b. Thus, higher density recording can be performed and the storage capacity can be increased.

(3) System Configuration

The constituent elements of the magnetic disk apparatus illustrated in the figures are based on the conceptions of the functions, and it is not necessarily needed to be physically constituted as illustrated in the figures. In other words, specific forms of separation and integration of the modules are not limited to the forms illustrated in the figures, and a part or all of the modules may be physically separated or integrated using arbitrary modules in accordance with various loads and usage statuses (for example, integrating the movement controller and the junction calculator). Further, all or any part of each processing function performed in the modules may be realized by an MCU (or a control device such as a CPU (Central Processing Unit) or an MPU (Micro Processing Unit)) and a program analyzed and executed by the MCU (or a control device such as a CPU (Central Processing Unit) or an MPU (Micro Processing Unit)), or may be realized as hardware of wired logic.

In the processing described in the embodiment, all or a part of the processing described as processing performed automatically may be performed manually, or all or a part of the processing described as processing performed manually may be performed automatically by a known method. Other than the above, processing procedures, control procedures, specific names, and information including various data and parameters described in the above description and the figures can be arbitrary changed if not otherwise specified. Although a case in which a magnetic disk is used is described in the embodiment, the invention is not limited to this, but the invention can be applied to a storage apparatus using a motor for another storage medium.

(4) Program

The servo pattern write control processing of the magnetic disk described in the embodiment can be realized by executing a program prepared in advance by a computer (for example, the MCU of the magnetic disk apparatus). This program can be distributed via a network such as the Internet. Also, this program can be recorded on a computer-readable recording medium such as a CD-ROM, MO, DVD, and the like, and can be executed by reading the program from the recording medium by a computer.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A servo pattern writing method comprising:
   moving a head from a first one of an innermost circumference and an outermost circumference of a medium to the remainder other than the first one while controlling a position of the head in accordance with a temporary pattern indicating information for controlling the position of the head, the temporary pattern being preliminarily written on the medium;
   calculating a junction between a servo pattern to be written from the innermost circumference and a servo pattern to be written from the outermost circumference based on a movement distance of the moved head;
   first writing the servo pattern from a second one of the innermost circumference and the outermost circumference to the junction, while controlling the position of the head in accordance with the temporary pattern, after moving the head to the second one; and
   second writing the servo pattern from the remainder other than the second one to the junction, while controlling the position of the head in accordance with the temporary pattern, after moving the head to the remainder other than the second one.

2. The servo pattern writing method of claim 1, wherein the temporary pattern is a spiral pattern which is not a concentrically written pattern but is a pattern written in a spiral fashion continuously from the innermost circumference to the outermost circumference.

3. The servo pattern writing method of claim 1, wherein the moving includes controlling the position of the head by using a relative position error between the temporary pattern and the head,
   the first writing includes controlling the position of the head in accordance with the temporary pattern by using the relative position error, and
   the second writing includes controlling the position of the head in accordance with the temporary pattern by using the relative position error.

4. The servo pattern writing method of claim 1, wherein the medium is a perpendicular magnetic recording medium.

* * * * *